(12) United States Patent
Marcos

(10) Patent No.: US 10,443,540 B2
(45) Date of Patent: Oct. 15, 2019

(54) THRUST REVERSAL FOR TURBOFAN GAS TURBINE ENGINE

(71) Applicant: United Technologies Corporation, Hartford, CT (US)

(72) Inventor: Juan A. Marcos, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 741 days.

(21) Appl. No.: 14/707,500

(22) Filed: May 8, 2015

(65) Prior Publication Data

US 2016/0326984 A1 Nov. 10, 2016

(51) Int. Cl.
| | | |
|---|---|---|
| F02K 1/72 | (2006.01) |
| F01D 21/14 | (2006.01) |
| F02K 1/76 | (2006.01) |
| F02K 1/09 | (2006.01) |
| F02C 9/26 | (2006.01) |

(52) U.S. Cl.
CPC ............... *F02K 1/72* (2013.01); *F01D 21/14* (2013.01); *F02C 9/26* (2013.01); *F02K 1/09* (2013.01); *F02K 1/76* (2013.01); *F02K 1/766* (2013.01); *F05D 2260/90* (2013.01); *F05D 2270/042* (2013.01); *F05D 2270/051* (2013.01); *F05D 2270/095* (2013.01); *F05D 2270/102* (2013.01); *F05D 2270/114* (2013.01); *F05D 2270/335* (2013.01); *Y02T 50/671* (2013.01)

(58) Field of Classification Search
CPC ............. F05D 2270/00; F05D 2270/04; F05D 2270/042; F05D 2270/30; F05D 2270/335; F05D 2260/90; F05D 2260/901; F05D 2260/904; F05D 2270/095; B64D 31/12; F02K 1/54; F02K 1/09; F01D 21/14
See application file for complete search history.

(56) References Cited

U.S. PATENT DOCUMENTS

| | | | | |
|---|---|---|---|---|
| 3,279,184 A | * | 10/1966 | Felix | F02K 1/76 60/224 |
| 3,321,921 A | * | 5/1967 | Criffield | F02K 1/76 244/110 A |
| 3,736,750 A | * | 6/1973 | Britt | F02C 7/045 137/15.1 |

(Continued)

FOREIGN PATENT DOCUMENTS

| | | |
|---|---|---|
| FR | 2640228 | 12/1989 |
| FR | 2922959 | 5/2009 |

(Continued)

OTHER PUBLICATIONS

European Search Report for European Patent Application No. 16168699 dated Sep. 23, 2016.

*Primary Examiner* — Alain Chau
(74) *Attorney, Agent, or Firm* — Carlson, Gaskey & Olds, P.C.

(57) ABSTRACT

A method of thrust reversal operation according to an example of the present disclosure includes, among other things, permitting an increase in engine power when at least one criterion is not met and a thrust reverser is deployed, and denying the increase in engine power when the at least one criterion is met. A system for thrust reversal is also disclosed.

18 Claims, 7 Drawing Sheets

(56) References Cited

U.S. PATENT DOCUMENTS

| | | | | |
|---|---|---|---|---|
| 3,920,203 | A * | 11/1975 | Moorehead | B64C 21/04 244/110 B |
| 4,391,409 | A * | 7/1983 | Scholz | F02K 1/763 239/265.29 |
| 5,167,119 | A | 12/1992 | Ward | |
| 5,230,213 | A * | 7/1993 | Lawson | F02K 1/563 244/110 B |
| 5,285,634 | A * | 2/1994 | Hoff | F02C 9/28 60/39.281 |
| 6,845,945 | B1 * | 1/2005 | Smith | B64D 33/04 239/265.19 |
| 7,107,757 | B2 * | 9/2006 | Andre | B64D 27/18 244/75.1 |
| 8,275,507 | B2 * | 9/2012 | Bader | F02K 1/76 60/226.2 |
| 8,613,185 | B2 * | 12/2013 | Dupre | B64D 31/12 244/110 B |
| 8,651,811 | B2 | 2/2014 | Danielson | |
| 8,733,698 | B2 * | 5/2014 | Abrial | F02C 9/00 244/110 B |
| 8,892,295 | B2 | 11/2014 | Zaccaria | |
| 9,464,595 | B2 * | 10/2016 | Chalaud | F02K 1/76 |
| 2010/0115915 | A1 * | 5/2010 | Dehu | F02K 1/763 60/226.2 |
| 2010/0235001 | A1 * | 9/2010 | Zaccaria | F02K 1/763 700/275 |
| 2010/0242434 | A1 * | 9/2010 | Bader | F02K 1/76 60/226.2 |
| 2011/0108665 | A1 * | 5/2011 | Abrial | F02C 9/00 244/110 B |
| 2012/0304666 | A1 * | 12/2012 | Maalioune | F02K 1/15 60/801 |
| 2014/0229122 | A1 * | 8/2014 | Horabin | G05B 23/0235 702/35 |
| 2015/0361920 | A1 * | 12/2015 | Chalaud | F02K 1/76 701/3 |
| 2016/0328892 | A1 * | 11/2016 | Coupard | G05B 23/0283 |

FOREIGN PATENT DOCUMENTS

| | | |
|---|---|---|
| FR | 2930973 | 11/2009 |
| FR | 2956163 | 8/2011 |
| GB | 1450076 | 9/1976 |
| GB | 2462508 | 9/2010 |
| RU | 2347093 | 2/2009 |
| WO | 2013164546 | 7/2013 |

* cited by examiner

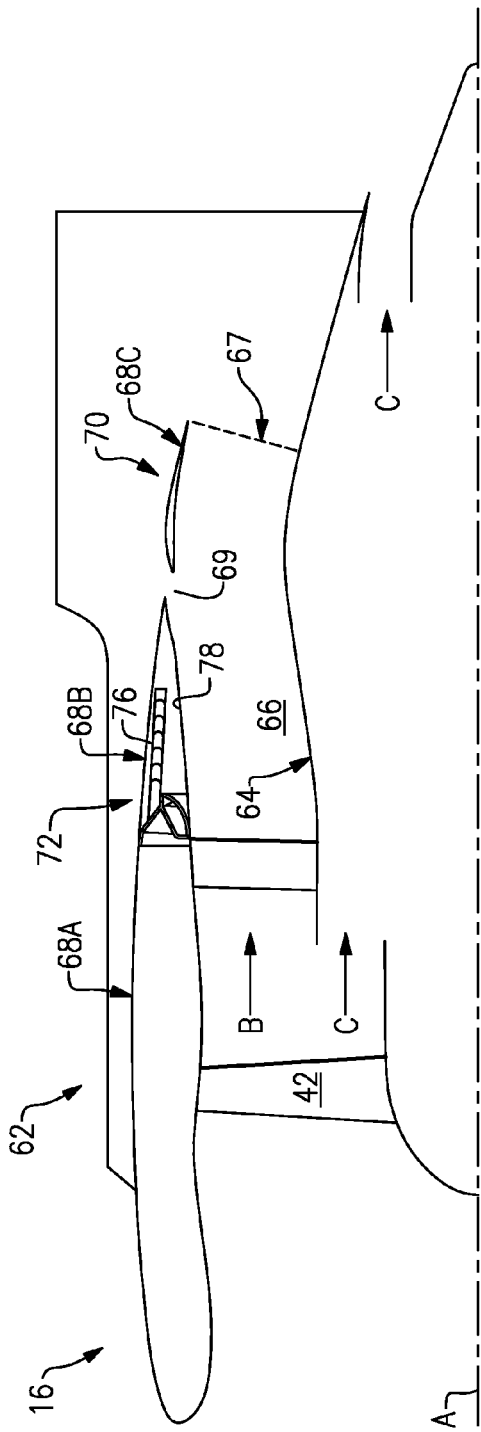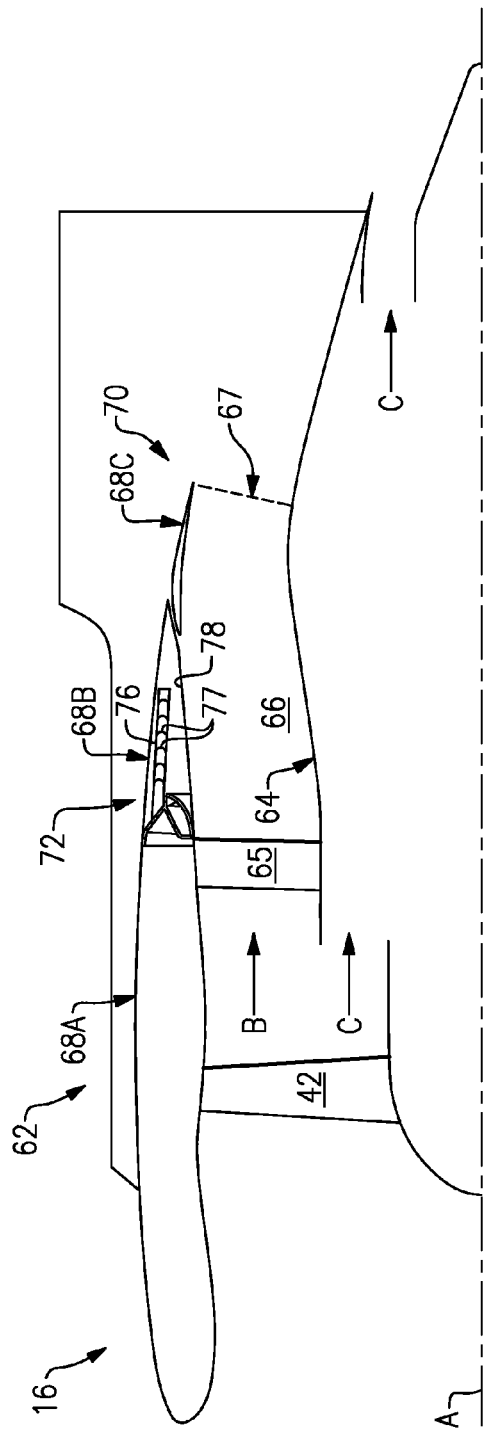

THRUST REVERSAL FOR TURBOFAN GAS TURBINE ENGINE

BACKGROUND

The present disclosure relates to a thrust reverser, and more particular to thrust reversal operation.

Gas turbine engines can include a fan nacelle defining a bypass duct. The fan also delivers air into a core engine where it is compressed. The compressed air is then delivered into a combustion section, where it is mixed with fuel and ignited. The combustion gas expands downstream over and drives turbine blades.

Some gas turbine engines include a thrust reverser in which a translatable nacelle forms an outer wall portion of the bypass duct. The translatable nacelle is moved axially to communicate a portion of bypass airflow radially outward via a cascade to provide reverse thrust.

SUMMARY

A system for thrust reversal according to an example of the present disclosure includes a computing device including memory and a processor. The computing device is configured to execute a data module and a comparison module. The data module is configured to access data corresponding to a thrust reversal mode, an engine power condition and an engine power request. The comparison module is configured to cause an indicator to be generated when the engine power request during the thrust reversal mode meets at least one criterion.

In a further embodiment of any of the forgoing embodiments, the at least one criterion is a predetermined criterion and includes an engine reverse power threshold and a predetermined reversal time limit.

In a further embodiment of any of the forgoing embodiments, the comparison module is configured to permit multiple thrust reversal cycles during the thrust reversal mode when aircraft velocity is below a predefined velocity threshold and a weight-on-wheel condition is met, and a duration between each cycle of the multiple thrust reversal cycles is according to the at least one predetermined criterion.

In a further embodiment of any of the forgoing embodiments, the comparison module is configured to cause the present engine power to be reduced in response to the at least one criterion being met.

In a further embodiment of any of the forgoing embodiments, the comparison module is configured to cause the engine power request to be denied in response to the at least one criterion being met, the at least one criterion includes throttle position and an elapsed idle time since a previous thrust reversal cycle, and the at least one criterion relates to expiration of the elapsed idle time.

In a further embodiment of any of the forgoing embodiments, the indicator is a maintenance indicator relating to operation in the thrust reversal mode in excess of a predefined limit when the at least one predetermined criterion is met.

A gas turbine engine according to an example of the present disclosure includes a fan section including a fan nacelle arranged at least partially about a fan, an aft nacelle moveable relative to the fan nacelle, and a core engine including a compressor section and a turbine section arranged within a core cowling. The turbine section is configured to drive the fan. The fan nacelle and the aft nacelle are arranged at least partially about the core cowling to define a bypass flow path. A thrust reverser is configured to selectively communicate a portion of fan bypass airflow from the bypass flow path when in a thrust reversal mode. A controller is in communication with the core engine and the thrust reverser. The controller is configured to receive position information of the thrust reverser and engine power information of the core engine, configured to cause the core engine to deny an engine power request during the thrust reversal mode when at least one criterion is met, and configured to respond to the engine power request when the at least one predetermined criterion is not met.

In a further embodiment of any of the forgoing embodiments, the at least one criterion is a predetermined criterion and includes an engine reverse power threshold and a predefined time limit relating to the engine reverse power threshold.

In a further embodiment of any of the forgoing embodiments, the predefined time limit relates to a configuration of at least one of the fan section and the thrust reverser.

In a further embodiment of any of the forgoing embodiments, the controller is configured to permit multiple thrust reversal cycles during the thrust reversal mode when aircraft velocity is below a predefined threshold and a weight-on-wheel condition is met, and a minimum duration between each cycle of the multiple thrust reversal cycles is according to the at least one predetermined criterion.

In a further embodiment of any of the forgoing embodiments, a maximum time period of each thrust reversal cycle is less than the minimum duration.

In a further embodiment of any of the forgoing embodiments, the controller is configured to cause the core engine to reduce engine power when the at least one predetermined criterion is met, and is configured to permit the core engine to increase engine power when the predetermined criterion is not met.

A method of thrust reversal operation according to an example of the present disclosure includes permitting an increase in engine power when at least one criterion is not met and a thrust reverser is deployed, and denying the increase in engine power when the at least one criterion is met.

A further embodiment of any of the foregoing embodiments includes reducing engine power when the at least one criterion is met. The at least one criterion is a predetermined criterion and includes a predefined time limit relating to an engine reverse power threshold.

In a further embodiment of any of the forgoing embodiments, the steps of permitting the increase in engine power when the at least one criterion is not met and the thrust reverser is deployed, denying the increase in engine power when the at least one criterion is met, and reducing engine power when the at least one criterion is met are repeated when aircraft velocity is negative.

In a further embodiment of any of the forgoing embodiments, a minimum duration between a current iteration of the step of permitting the increase in engine power when the at least one criterion is not met and the thrust reverser is deployed and a prior iteration of the step of denying the increase in engine power when the at least one criterion is met is greater than the predefined time limit.

In a further embodiment of any of the forgoing embodiments, the step of denying the increase in engine power when the at least one predetermined criterion is met includes comparing the minimum duration to an elapsed time since the predefined time limit was met.

In a further embodiment of any of the forgoing embodiments, the at least one criterion includes throttle position and an elapsed idle time since a previous thrust reversal cycle.

In a further embodiment of any of the forgoing embodiments, the at least one criterion relates to expiration of the elapsed idle time.

In a further embodiment of any of the forgoing embodiments, the at least one criterion is not met when the engine power is below a predefined steady-state engine reverse power threshold.

Although the different embodiments have the specific components shown in the illustrations, embodiments of this disclosure are not limited to those particular combinations. It is possible to use some of the components or features from one of the embodiments in combination with features or components from another one of the embodiments.

The various features and advantages of this invention will become apparent to those skilled in the art from the following detailed description of an embodiment. The drawings that accompany the detailed description can be briefly described as follows.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 2A is a schematic view of the engine and a nacelle assembly with a thrust reverser and a variable area fan nozzle (VAFN) in a closed position, according to an embodiment.

FIG. 2B schematically shows the thrust reverser of FIG. 2A in the closed position and the VAFN in an open position, according to an embodiment.

DETAILED DESCRIPTION

Figure 1:
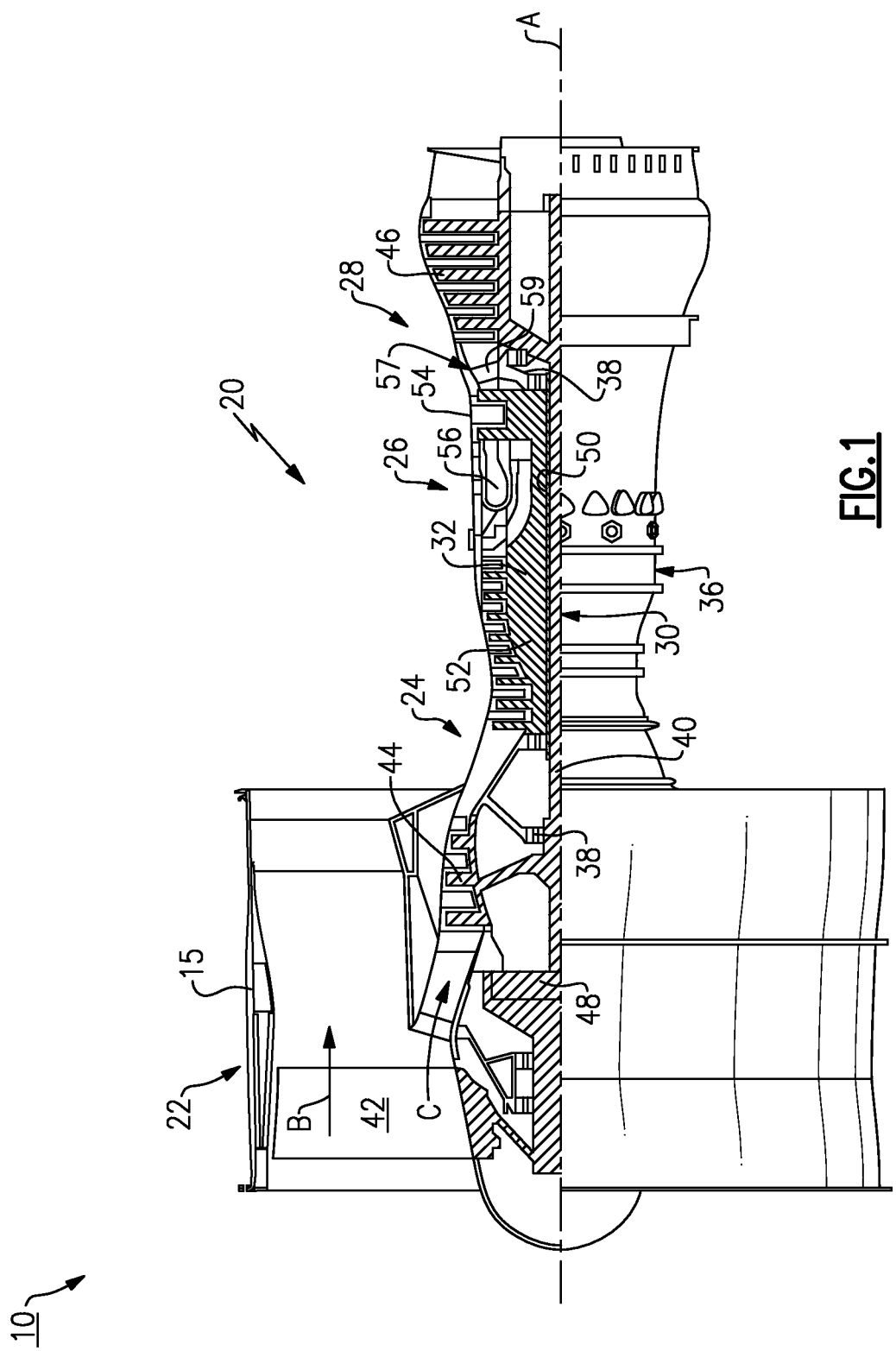
FIG. 1 shows a schematic view a gas turbine engine along an engine longitudinal axis, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one embodiment is a high-bypass geared aircraft engine. In a further embodiment, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans, and three shaft turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2C:
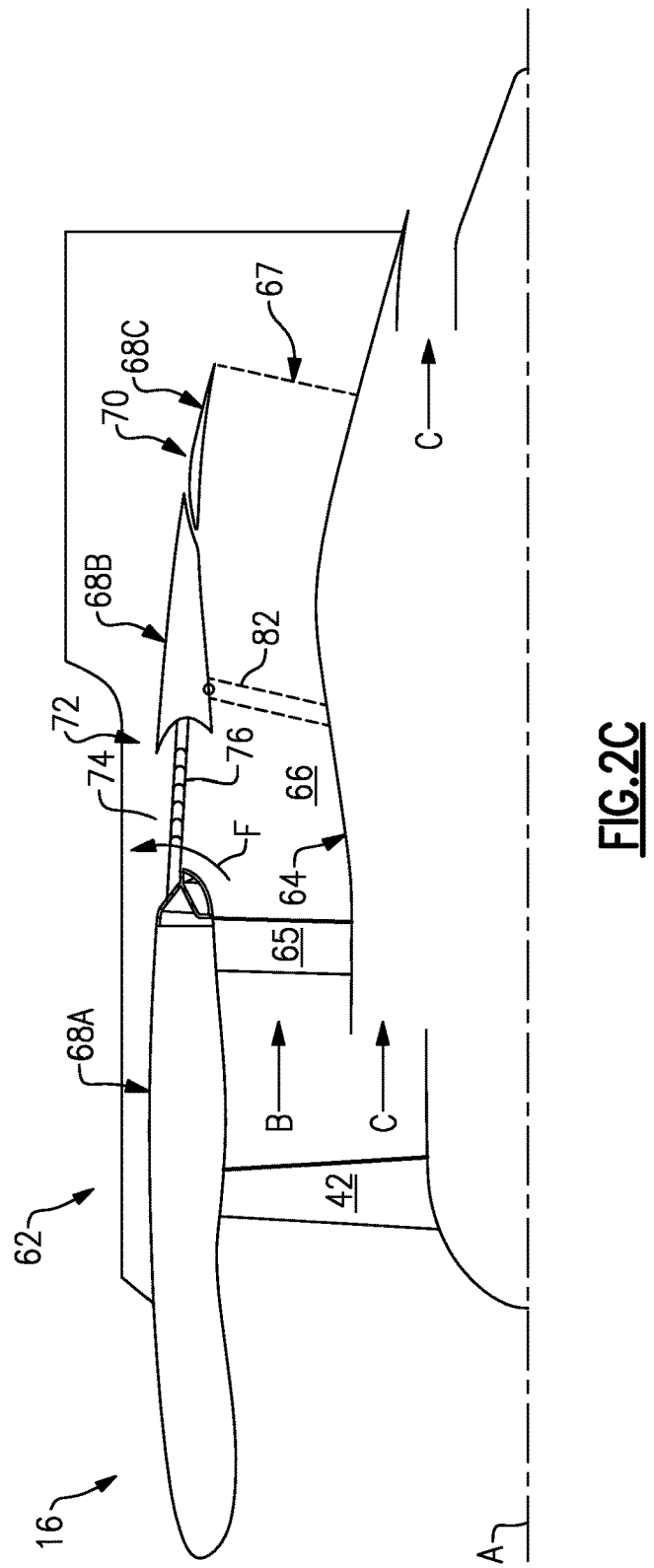
FIG. 2C schematically shows the thrust reverser of FIG. 2A in an open position and the VAFN in the closed position, according to an embodiment.

FIGS. 2A to 2C illustrate a highly schematic view of a nacelle assembly 16 for the engine 20 of FIG. 1. The nacelle assembly 16 includes a fan nacelle 62 and a core cowling 64 arranged coaxially about the engine axis A. The fan nacelle 62 and the core cowling 64 define outer flow surfaces of the nacelle assembly 16.

The fan nacelle 62 includes a first (or forward) nacelle section 68A and a second (or aft) nacelle section 68B axially aft of the first fan nacelle section 68A relative to the engine axis A. The fan nacelle 62 at least partially surrounds the core cowling 64 to define a generally annular bypass duct 66 configured to communicate bypass airflow B from the fan 42.

The core cowling 64 is arranged downstream of the fan 42 to guide a portion of the fan airflow to the core flow path C. The core cowling 64 is supported within the fan nacelle 62 by one or more circumferentially spaced structures or FEGVs 65. The bypass airflow B communicates through the bypass duct 66 and is discharged through a nozzle exit area 67 between the fan nacelle 62 and the core cowling 64.

In some embodiments, the nacelle assembly 16 includes a variable area fan nozzle (VAFN) 70 configured to vary a geometry of the nozzle exit area 67. In the illustrative embodiment, the VAFN 70 is defined by a third nacelle section 68C moveable relative to the second nacelle section 68B between a stowed position (FIGS. 2A and 2C) and a deployed position (FIG. 2B) to vary a geometry of the nozzle exit area 67. The VAFN 70 selectively adjusts or varies a physical area and geometry of the bypass flow path B to modulate the bypass airflow during various operating conditions of the engine 20. Although the VAFN 70 is illustrated having the third nacelle section 68C, in other embodiments the second and third nacelle sections 68B, 68C are combined to vary a geometry of the nozzle exit area 67.

In the illustrative embodiment, the VAFN 70 includes an auxiliary port 69 (FIG. 2B) selectively defined between the second nacelle section 68B and the third nacelle section 68C. That is, the third nacelle section 68C is axially moveable relative to the second nacelle section 68B between a stowed position to close the auxiliary port 69 (FIG. 2A) and a deployed position to open the auxiliary port 69 (FIG. 2B) to selectively adjust or modulate the bypass airflow communicated in the bypass flow path B. That is, the auxiliary port 69 effectively increases the fan nozzle exit area 67.

The nacelle assembly 16 includes a thrust reverser 72 configured to selectively communicate a portion of bypass airflow between the bypass flow path B and a secondary flow passage 74 (FIG. 2C). The second nacelle section 68B is movable relative to the first nacelle section 68A along the engine axis A to define the secondary flow passage 74. The second and third nacelle sections 68B, 68C are configured to translate relative to the engine axis A utilizing various techniques, including one or more actuators and controls, for example.

The thrust reverser 72 includes one or more cascades 76 arranged between the first and second nacelle sections 68A, 68B. The cascade 76 includes one or more sections arranged about the engine axis A to define a generally annular array. The cascade 76 includes one or more vanes 77 configured to direct airflow F through the secondary flow passage 74 and generate reverse thrust, such as during landing or ground operations of the aircraft. In the illustrative embodiment, the second nacelle section 68B is translated axially from the first nacelle section 68A to uncover or deploy the cascade 76 (FIG. 2C).

While stowed (FIGS. 2A and 2B), the cascade 76 is received at least partially within a cascade cavity 78 defined between inner and outer walls of the second nacelle section 68B. In the illustrative embodiment, the cascade 76 is mounted to the first nacelle section 68A such that the second nacelle section 68B translates relative to the cascade 76. In an alternative embodiment, the cascade 76 is mounted to the second nacelle section 68B such that the cascade 76 translates relative to the first nacelle section 68A and is stowed at least partially between inner and outer walls of the first nacelle section 68A.

In some embodiments, the thrust reverser 72 includes one or more blocker doors 82 (shown schematically as dashed lines in FIG. 2C) pivotably mounted to the second nacelle section 68B. The blocker doors 82 are pivotable between a stowed position and a deployed position (FIG. 2C) to direct the bypass flow B towards the cascade 76 in the secondary flow passage 74. Translation of the second fan nacelle section 68B causes the blocker doors 82 to move from the stowed position to the deployed position. In alternative embodiments, surface contouring of the second nacelle section 68B and/or the core cowling 64 along the bypass duct 66 provides similar functionality as the blocker doors 82 to modulate the bypass flow B.

It may be desirable to operate in a thrust reverser mode during landing and ground operations. However, there can be various complications relating to thrust reversal during such operations, such as high reverse power after the aircraft slows down to low velocity or stops completely. For example, distorted engine inlet air flow can occur, causing resultant stresses on the fan blades 42. Hot gas re-ingestion and compressor surge can occur in some situations, depending on cross-winds and other environmental conditions. In some situations, thrust reverser 70 effluent causes debris adjacent to the aircraft to become unsettled, potentially resulting in the debris being ingested and causing foreign object damage (FOD). For these complications, which may be present at high reverse thrust and low velocity or static aircraft, typical engine operating instruction manuals include restrictions to reverser power below a certain airspeed.

Figure 3:
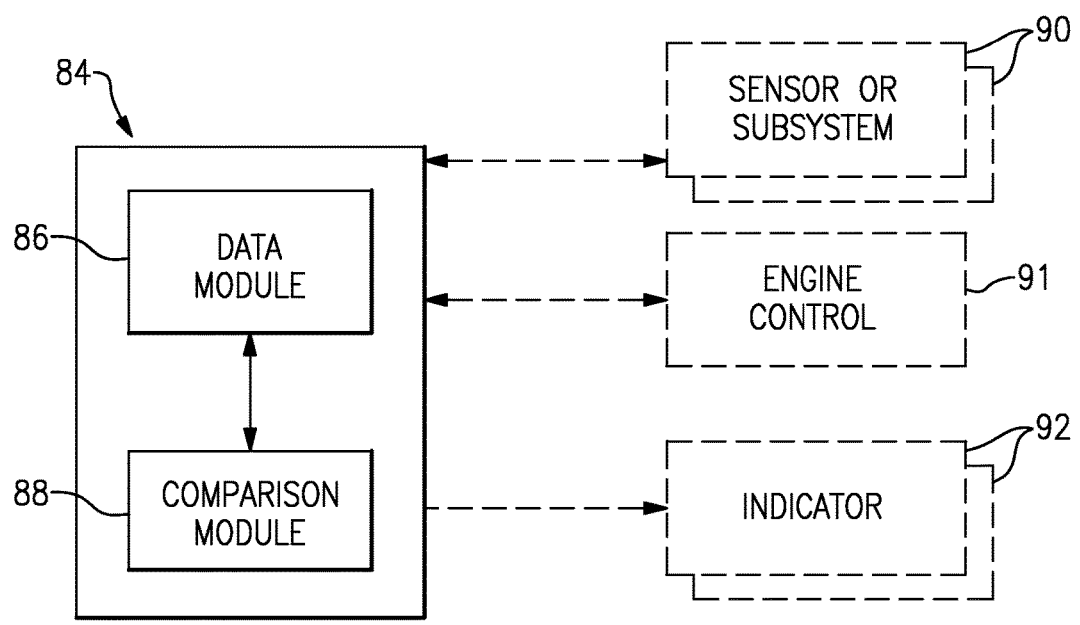
FIG. 3 illustrates a controller for thrust reversal, according to an embodiment.

FIG. 3 illustrates a controller 84 configured for thrust reversal operations. The controller 84 is configured to modulate generation of reverse thrust to reduce the various risks of operating in a thrust reverser mode during landing and ground operations, and/or inform aircrew to manually implement the techniques discussed herein. The techniques discussed herein can be utilized when aircraft velocity is below (or above) a predefined velocity threshold and/or a weight-on-wheel condition is met, for example.

The controller 84 includes a data module 86 in communication with a comparison module 88. The data module 86 is in communication with one or more subsystems or sensors 90 to access various data or information relating to operation of the engine 20, nacelle assembly 16, thrust reverser 72, and/or aircraft, for example. The information includes a thrust reversal mode or position of the thrust reverser 72, such as deployed and stowed positions. In the illustrative embodiment, the information includes an actual previous or present engine power condition of the core engine 20, measured in revolutions per minute (RPM), for example, and an engine power request or command, measured in revolutions per minute (RPM), which can correspond to a throttle position of an instrument in a cockpit of the aircraft. In some embodiments, the information includes a velocity of the aircraft, or a weight of the aircraft airframe on the wheels or landing gear.

The comparison module 88 is configured to determine when an engine power request or command made during a thrust reversal mode meets at least one predetermined criterion. In the illustrative embodiment, the comparison module 88 is in communication with an engine controller 91 such as a full-authority digital electronic control (FADEC) or an electronic engine control (EEC). In alternative embodiments, alternative engine controllers can be utilized. In the illustrative embodiment, the comparison module 88 is configured to cause engine power requests to be denied in response to the predetermined criterion or other criteria being met, and in further embodiments is configured to cause the present engine power of the engine 20 to be reduced. In some embodiments, the comparison module 88 is configured to permit, or otherwise cause, the engine 20 to respond to an increase in the present engine power when the predetermined criterion is not met, but deny a request to increase the present engine power when the predetermined criterion or other criteria is met.

In some embodiments, the comparison module 88 is configured to cause one or more indicators 92 to be generated when the predetermined criterion is met. The indicators 92 include a visual or audible warning to the cockpit or crew, for example. In some embodiments, the indicators 92 include one or more flags or maintenance indicators to alert maintenance crews that the engine 20 has been operated outside of the desired limits and thresholds discussed herein. In further embodiments, the maintenance indicators require a clearing by maintenance personnel once the maintenance indicators have been set.

Various predetermined criteria can be utilized. In the illustrative embodiment, predetermined criteria include a predefined engine power threshold, such as a particular percentage RPM of the engine 20, and a predefined reversal time limit when the engine 20 operates at or above the predefined engine power threshold when in a thrust reversal mode. In the illustrative embodiment, the predefined engine power threshold is about 70 percent of a maximum engine RPM of the engine 20. In further embodiments, multiple predefined engine power thresholds are defined, and each threshold has a predefined reversal time limit which corresponds to a desired time for a single thrust reversal cycle.

The predefined reversal time limit is correlated to a configuration of the fan section 22, nacelle assembly 16 and/or thrust reverser 70, for example, and is selected to reduce a risk of distorted engine inlet air flow, hot gas re-ingestion and surge, and/or ingestion of debris unsettled by the thrust reverser 70 effluent, for the correlated configuration. In the illustrative embodiment, the predefined reversal time limit is about 7 seconds. Alternative predefined reversal time limits can be selected depending on the needs of a particular situation. Although engine power is primarily discussed herein, other operating parameters can be utilized, such as fan speed. In other embodiments, the predetermined criteria include aircraft velocity and/or a weight-on-wheels condition indicating when the aircraft is located on the ground, which is measured by sensors 90 and in the illustrative embodiment is required to implement thrust reversal during landing or ground operations. In another embodiment, the predetermined criteria include throttle position, such as reverse idle to enable increases in engine power, thereby reducing a risk of automatic acceleration.

The comparison module 88 is configured to permit an increase in the present engine power of the core engine when the previous or present engine power is below the predefined engine power threshold. In a further embodiment, the present engine power is increased or decreased when the present engine power is below a predefined steady-state engine power threshold without a time constraint. In the illustrative embodiment, the predefined steady-state engine power is about 55 percent of the maximum engine RPM of engine 20. This technique allows a relatively low level of reverse thrust to be generated while the present engine power remains below the engine reverse power threshold, and may be sufficient to initiate a rearward roll of an aircraft in some cases, but may be insufficient to initiate a rearward roll under high friction surfaces such as gravel runways or runways with an upward slope.

The comparison module 88 is configured to permit multiple thrust reversal cycles during a single deployment in the thrust reversal mode, such as during landing or backing away from a loading gate. Each cycle is defined by an instance of permitting an increase in present engine power at or above the predefined engine reverse power threshold, and an instance of denying an increase in the present engine power when the predetermined criteria or criterion is met, for example.

In a further embodiment, a minimum duration between each cycle of the multiple thrust reversal cycles is selected according to the predetermined criterion, or other criterion. In one embodiment, the minimum duration is selected to reduce a risk of ingestion of debris unsettled by the thrust reverser 70 effluent. In the illustrative embodiment, the minimum duration is about 30 seconds. Alternative minimum durations can be selected depending on the needs of a particular situation. In the illustrative embodiment, the comparison module 88 is configured to compare the minimum duration to an elapsed time since the predetermined criterion or other criterion was met or a previous thrust reversal cycle has occurred. The comparison module 88 is configured to permit an increase in the present engine power when the elapsed time is equal to or greater than the minimum duration, and deny requests and/or provide messages to the pilot through indicator(s) 92 when the elapsed time is less than the minimum duration. The elapsed time is based on an elapsed idle time defined as an amount of time the engine 20 has been operating at a reduced power condition, such as reverse idle, since a previous thrust reversal cycle, for example. The comparison module 88 is configured to determine when the elapsed idle time expires to permit an increase in the present engine power. In the illustrative embodiment, a maximum time period of each thrust reversal cycle is less than the minimum duration. Alternative maximum time periods can be selected depending on the needs of a particular situation.

Figure 4:
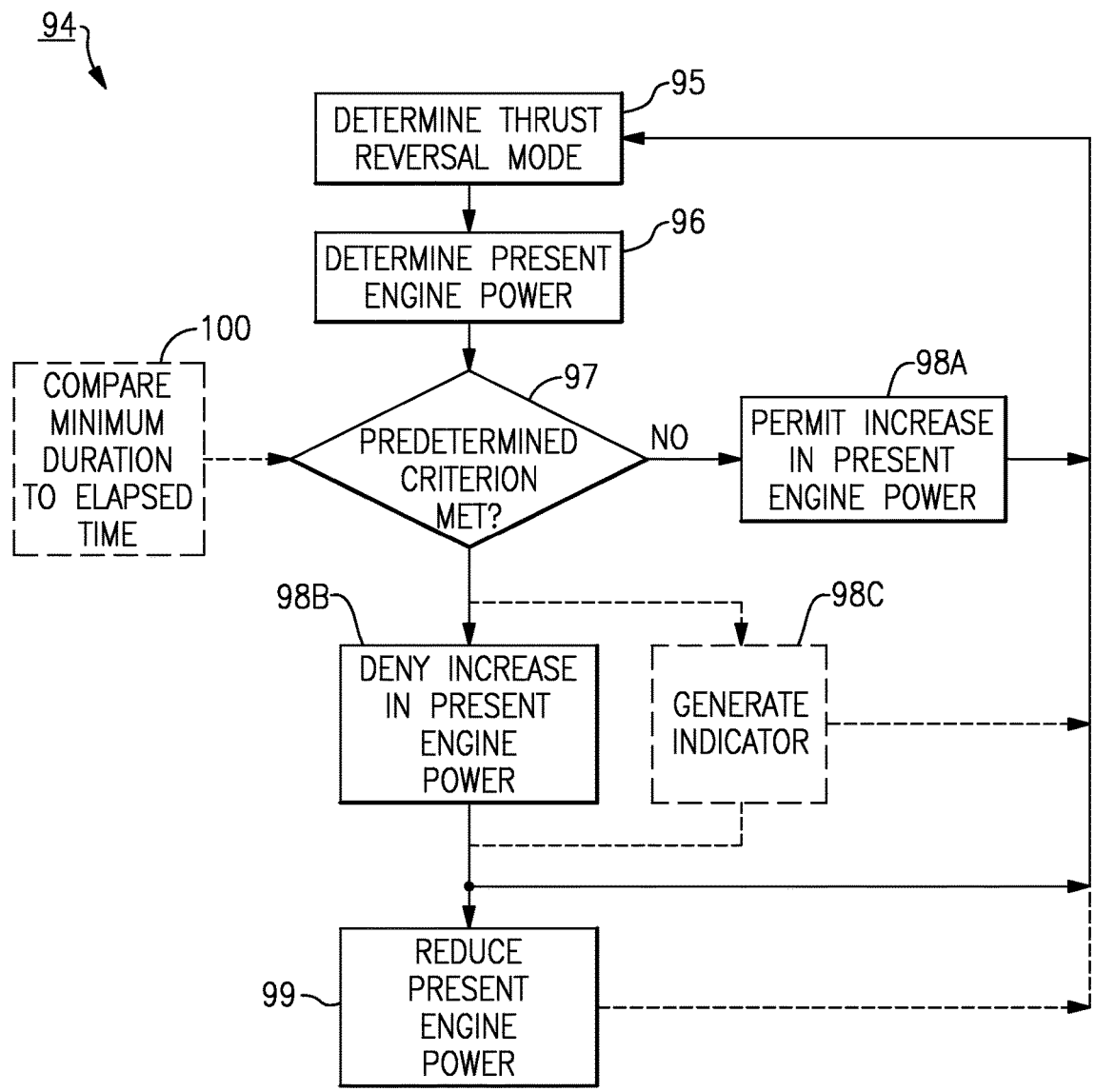
FIG. 4 illustrates a method for thrust reversal, according to an embodiment.

FIG. 4 illustrates in a flowchart a method 94 of thrust reversal which can be utilized with engine 20, nacelle assembly 16 and thrust reverser 72, according to an embodiment. Corresponding logic for performing method 94 can be implemented on controller 84, for example. At block 95 the method 94 determines whether a thrust reverser is in a deployed position or thrust reversal mode. At block 96 a previous or present engine power is determined. At block 97 the method 94 determines whether at least one predetermined criterion or other criterion is met when in the thrust reversal mode. The predetermined criterion can include one or more criterion, including any of the criteria discussed herein, such as a predefined time limit relating to a predefined engine reverse power threshold, aircraft velocity, and/or previous or present power level.

At block 98A a command or request to increase the present engine power is permitted when the predetermined criterion or other criterion is not met. At block 98B a request to increase the present engine power is denied when the predetermined criterion is met, or in some embodiments an indicator is generated at block 98C. In some embodiments, the present engine power is reduced when the predetermined criterion is met at block 99. In some situations, the blocks of permitting 98A, denying 98B and/or reducing 99 are repeated when aircraft velocity is negative or below zero, for example, such as when thrust reversal is initiated for an aircraft that is static, and one or more subsequent iterations or cycles occur to continue a rearward roll of the aircraft.

In some embodiments, at block 100 the method 94 determines whether a minimum duration between a current iteration of the block of permitting 98A and a prior iteration of the block of denying 98B is greater than an elapsed time since the minimum duration was met.

Figure 5A:
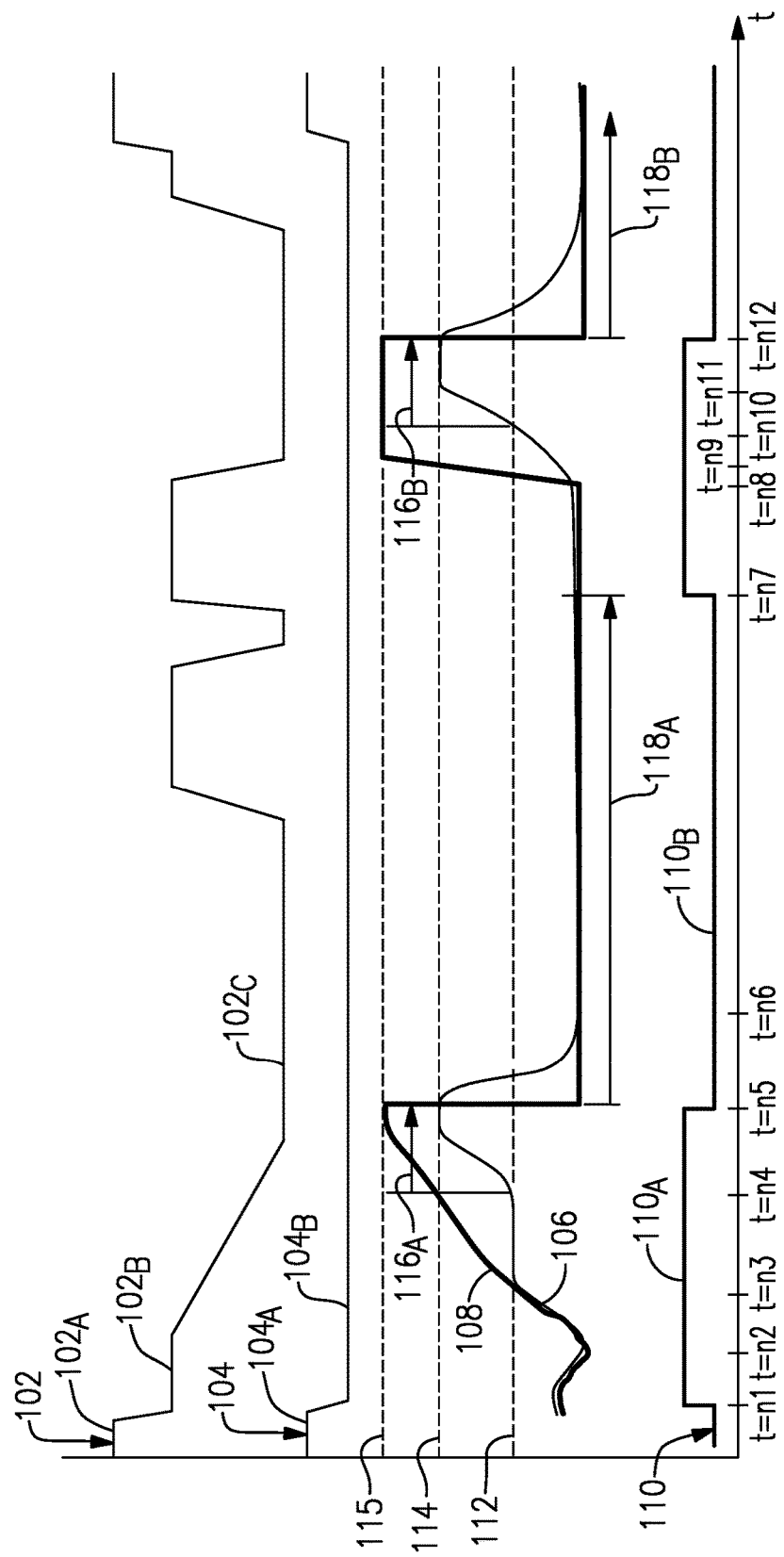
FIG. 5A illustrates an example of thrust reversal during static operation.

FIG. 5A illustrates an example of engine thrust reversal operation implementing method 94 to initiate a rearward roll of a static aircraft on the ground, sometimes referred to as power back, according to an embodiment. Line 102 indicates throttle position plotted over time, which can vary between values of maximum forward (not shown), forward idle 102A, minimum reverse 102B, and maximum reverse 102C, for example. Line 104 indicates a thrust reversal mode over time, including stowed 104A and deployed 104B positions of a thrust reverser. Curve 106 indicates actual or present engine power over time, and curve 108 indicates requested or commanded engine power corresponding to throttle position of line 102. Line 110 indicates whether thrust reversal is enabled or available at 110A, or is disabled or unavailable at 110B, correspond to one or more indicators 92 (FIG. 3), for example.

In the illustrative example, at time t=n1 throttle position is moved from forward idle at 102A to minimum reverse 102B, thrust reversal mode is changed from stowed 104A to deployed 104B, and thrust reversal is enabled at 110A. In this state, commanded engine power relative to throttle position is unrestricted such that curve 106 follows or is otherwise responsive to curve 108. At time t=n2 throttle position is moved relatively slowly from minimum reversal 102B to maximum reversal 102C, indicating a desire to generate reverse thrust. At time t=n3 curve 108 exceeds a first predetermined threshold at line 112, which corresponds to a predefined steady-state engine reverse power threshold discussed above, for example, or another a percentage of maximum engine power or RPMs. In the illustrative embodiment, the actual engine power is kept at the first predetermined threshold until requested engine power exceeds a second predetermined threshold at line 114. In other embodiments, curve 106 follows or is otherwise responsive to curve 108 such that the actual or present engine power is substantially the same as the requested or commanded engine power.

At time t=n4 the commanded engine power continues to increase such that curve 108 exceeds the second predetermined threshold at line 114, and causes an instance 116A of a first timer to be executed. The value of curve 106 increases such that actual engine power increases. In the illustrative embodiment, actual engine power is bounded by the second predetermined threshold at line 114. As shown, the commanded engine power is bounded by a third predetermined threshold at line 115, corresponds to a maximum rated reverse engine power, for example.

At time t=n5 the first timer 116A equals a predefined reversal time limit. Thereafter, actual engine power is reduced, as indicated by curve 106, and additional requested engine power is denied as indicated by curve 108, such that thrust reversal is unavailable as indicated by 110B, even though throttle position is set to maximum reverse 102C. A second timer 118A begins to execute, indicating an elapsed time or duration since a previous thrust reversal cycle or the first timer 116A expired. Thrust reversal can be terminated at any time by moving the throttle position to reverse idle 102B, for example, but the timers 116 and 118 are configured to continue to execute to avoid situations where an operator may attempt to defeat the logic of method 94.

At time t=n7 the second timer 118A exceeds a predetermined threshold, such as a minimum duration discussed above. An indication that thrust reversal is available or enabled is indicated at 110A. In the illustrative example, the method 94 is implemented such that thrust reversal is not enabled until throttle position is returned to minimum reverse 102B to reduce a risk of automatic acceleration when thrust reversal is available and throttle position is greater than reverse idle 102B.

At time t=n8 a relatively quick response for thrust reversal is commanded as indicated by curve 108 corresponding to a command for maximum reverse thrust 102C at time t=n9, which exceeds the second predetermined threshold or predefined engine reverse power threshold at line 114 and causes a second instance 116B of timer 116 to execute at time t=n10. The actual engine power increases until curve 106 reaches the second predetermined threshold 114 at time t=n11.

Once the second instance 116B of timer 116 exceeds the predetermined time threshold at time t=n12, such as the predefined reversal time limit discussed above, the actual engine power is reduced as shown by curve 106, a second instance 118B of the timer 118A begins to execute, and an indication 110B that thrust reversal is unavailable or disabled is generated.

Figure 5B:
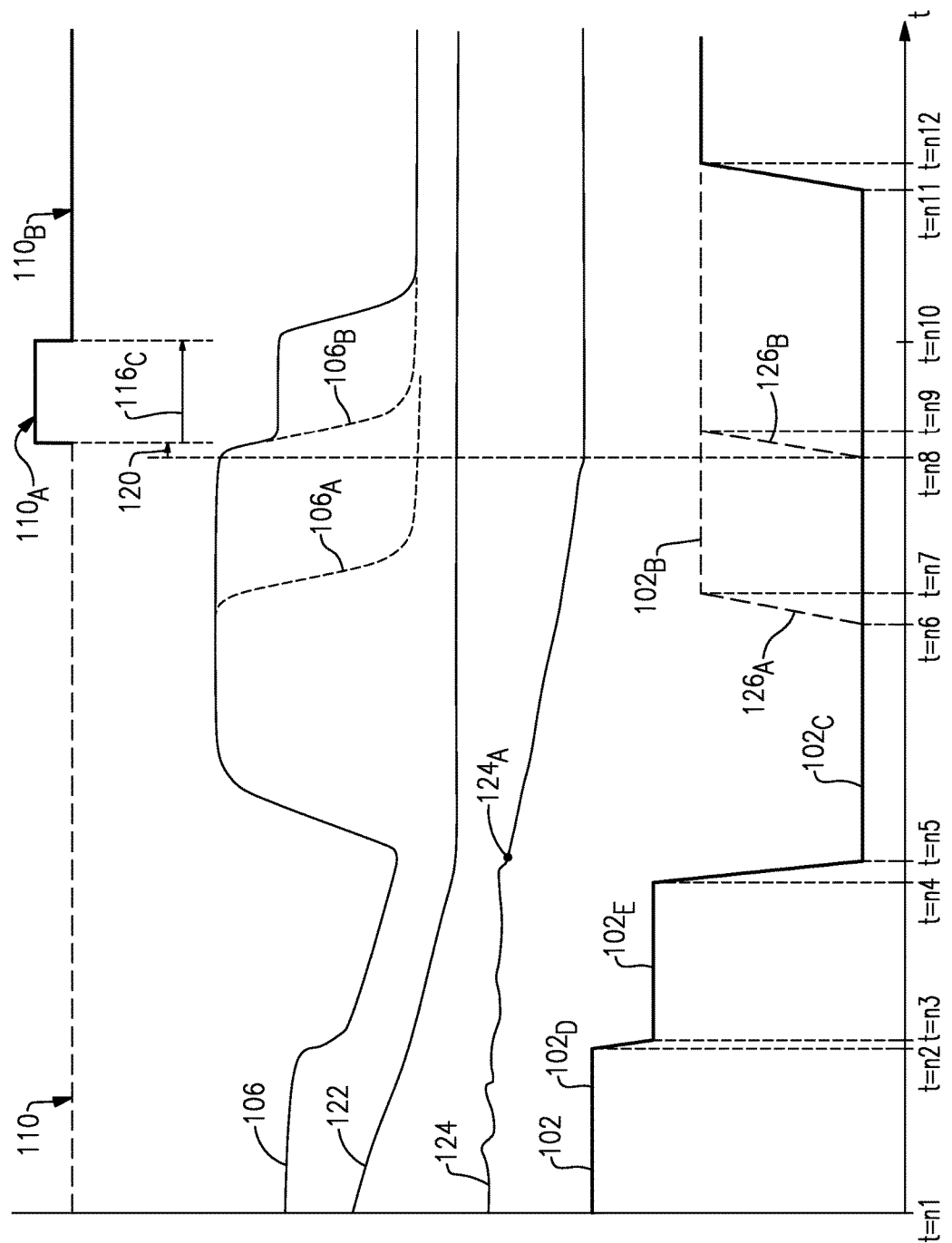
FIG. 5B illustrates an example of thrust reversal during a landing operation.

FIG. 5B illustrates an example of implementing method 94 when an aircraft is landing. For simplicity, curves 102, 106 and 110 depicted in FIG. 5A are referred to in FIG. 5B, although the particular values of curves 102, 106 and 110 in FIG. 5B are unrelated to the values in FIG. 5A. An aircraft descends when approaching a runway for landing at time t=n1, as indicated by altitude at curve 122 and airspeed at curve 124. Throttle position is set to approach power at 102D.

At time t=n2 throttle position is moved to approach idle indicated by 102E at time t=n3, causing actual or present engine power to be reduced as indicated by curve 106. At time t=n4 throttle position is moved to max reverse 102C at time t=n5, in which the aircraft is positioned on a runway and a weight-on-wheels condition is met. Actual engine power is increased to generate reverse thrust as indicated by curve 106, thereby reducing a velocity of the aircraft. During normal landing conditions, such as a dry concrete runway, a combination of thrust reversal and mechanical braking can be utilized to stop the aircraft, and thereafter throttle position is returned to reverse idle 102B as indicated by dashed curves 126B at time t=n6 until reverse idle occurs at time t=n7, causing actual engine power to be reduced as indicated by curve 106A. In some landing conditions such as icy runways, when mechanical braking is limited, or during emergencies, thrust reversal is implemented to a full stop of the aircraft until time t=n8, until the throttle position is returned to reverse idle 102B as indicated by dashed curve 126B at time t=n9.

During some conditions, it may be desirable to continue producing reverse thrust to initiate a backwards roll of the aircraft after landing roll has stopped. In the illustrative embodiment, method 94 is utilized to protect engine 20 against possible high fan stresses, hot gas ingestion and/or foreign object ingestion risks present at high reverse power and low aircraft velocity, including static operation, for example. A timer 120 begins to execute at time t=n8 to confirm that wheel speed and/or velocity of the aircraft is below a predetermined threshold. At time t=n9 thrust reversal is enabled as indicated by 110A. An instance 116C of timer 116 begins to execute when a predefined engine reverse power threshold is met, and at time t=n10 an auto deceleration occurs to return the actual engine power to idle as indicated by curve 106. Throttle position is kept at maximum reverse 102C at time t=n11 and until time t=n12 when it is returned to reverse idle 102B to permit a subsequent thrust reversal cycle as discussed above.

The controller 84 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the method 94 for operation of the controller 84 of this description. The interface facilitates communication with the other systems or components of the engine 20 or aircraft, for example. In some embodiments, the controller 84 is a portion of the FADEC or EEC, another system, or a stand-alone system.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A system for thrust reversal, comprising:
a gas turbine engine including a thrust reverser that selectively communicates a portion of fan bypass airflow from a bypass flow path in response to the thrust reverser operating in a thrust reversal mode, the thrust reverser moveable between stowed and deployed positions, and the thrust reversal mode corresponding to the deployed position;
a computing device including memory and a processor, the computing device configured to execute a data module and a comparison module;
wherein the data module is configured to access data corresponding to the thrust reversal mode, data corresponding to an engine power condition corresponding to the gas turbine engine and data corresponding to an engine power request corresponding to the gas turbine engine;
wherein the comparison module is configured to cause an indicator to be generated when the engine power request is made during the thrust reversal mode and at least one criterion is met;
wherein the comparison module is configured to cause present engine power of the gas turbine engine to be reduced during the thrust reversal mode in response to the at least one criterion being met; and
wherein the at least one criterion is a predetermined criterion and includes operation of the gas turbine engine in the thrust reversal mode above an engine reverse power threshold corresponding to the gas turbine engine for a period of time greater than a predetermined reversal time limit; and
wherein the comparison module is configured to cause the engine power request to be denied in response to the engine reverse power threshold being exceeded for the period of time greater than the predetermined reversal time limit, and wherein the comparison module is configured to permit the engine power request in response to the period of time being less than the predetermined reversal time limit.

2. The system as recited in claim 1, wherein the comparison module is configured to permit multiple thrust reversal cycles corresponding to the thrust reverser during the thrust reversal mode in response to an aircraft velocity associated with an aircraft having the system for thrust reversal being below a predefined velocity threshold and a weight-on-wheel condition associated with the aircraft being met, and the at least one predetermined criterion includes a duration between each cycle of the multiple thrust reversal cycles being less than a predefined minimum duration.

3. The system as recited in claim 2, wherein:
each thrust reversal cycle of the multiple thrust reversal cycles corresponds to an instance of permitting an increase in present engine power of the gas turbine engine at or above an engine reverse power threshold corresponding to the gas turbine engine and an instance of denying an increase in present engine power of the gas turbine engine; and
the comparison module is configured to permit a subsequent thrust reversal cycle of the multiple thrust reversal cycles to occur during a single deployment of the thrust reverser being in the thrust reversal mode in response to the instance of denying the increase in present engine power of the gas turbine engine occurring for a prior thrust reversal cycle of the multiple thrust reversal cycles.

4. The system as recited in claim 3, wherein:
the comparison module is configured to cause the engine power request to be denied in response to an elapsed idle time being less than a predefined minimum duration, the elapsed idle time defined as an amount of time since a previous thrust reversal cycle corresponding to the thrust reverser; and the comparison module is configured to permit the engine power request in response to the elapsed idle time exceeding the predefined minimum duration.

5. The system as recited in claim 1, wherein the comparison module is configured to cause the engine power request to be denied in response to the at least one criterion being met, the at least one criterion includes throttle position associated with an engine throttle of the gas turbine engine and an elapsed idle time since a previous thrust reversal cycle corresponding to the thrust reverser, and the at least one criterion relates to expiration of the elapsed idle time.

6. The system as recited in claim 1, wherein the indicator is a maintenance indicator relating to operation of the thrust reverser in the thrust reversal mode in excess of a predefined limit when the at least one predetermined criterion is met.

7. A gas turbine engine, comprising:
a fan section including a fan nacelle arranged at least partially about a fan;
an aft nacelle moveable relative to the fan nacelle;
a core engine including a compressor section and a turbine section arranged within a core cowling, the turbine section configured to drive the fan, the fan nacelle and the aft nacelle arranged at least partially about the core cowling to define a bypass flow path;
a thrust reverser that selectively communicates a portion of fan bypass airflow from the bypass flow path in response to the thrust reverser operating in a thrust reversal mode, the thrust reverser moveable between stowed and deployed positions, and the thrust reversal mode corresponding to the deployed position; and
a controller in communication with the core engine and the thrust reverser, the controller configured to receive position information of the thrust reverser and engine power information of the core engine, configured to cause the core engine to deny an engine power request corresponding to the core engine during the thrust reversal mode when at least one criterion is met, and configured to respond to the engine power request when the at least one criterion is not met;
wherein the controller is configured to cause the core engine to reduce engine power during the thrust reversal mode in response to the at least one criterion being met; and
wherein the at least one criterion is a predetermined criterion and includes operation of the core engine in the thrust reversal mode above an engine reverse power threshold corresponding to the core engine for a period of time greater than a predetermined reversal time limit.

8. The gas turbine engine as recited in claim 7, wherein the predetermined reversal time limit relates to a configuration of at least one of the fan section and the thrust reverser.

9. The gas turbine engine as recited in claim 7, wherein the controller is configured to permit multiple thrust reversal cycles corresponding to the thrust reverser during the thrust reversal mode when an aircraft velocity associated with an aircraft having the gas turbine engine is below a predefined threshold and a weight-on-wheel condition is met, and a minimum duration between each cycle of the multiple thrust reversal cycles is according to the at least one predetermined criterion.

10. The gas turbine engine as recited in claim 9, wherein a maximum time period of each thrust reversal cycle is less than the minimum duration.

11. The gas turbine engine as recited in claim 7, wherein the controller is configured to permit the core engine to increase engine power when the predetermined criterion is not met.

12. A method of thrust reversal operation, comprising:
providing a gas turbine engine including a thrust reverser that selectively communicates a portion of fan bypass airflow from a bypass flow path in response to the thrust reverser operating in a thrust reversal mode, the thrust reverser moveable between stowed and deployed positions, and the thrust reversal mode corresponding to the deployed position;
permitting an increase in engine power of the gas turbine engine when at least one criterion is not met and the thrust reverser is deployed in the thrust reversal mode;
denying the increase in engine power of the gas turbine engine when the at least one criterion is met;
reducing engine power of the gas turbine engine when the at least one criterion is met; and
wherein the at least one criterion is a predetermined criterion and includes operation of the gas turbine engine in the thrust reversal mode above an engine reverse power threshold corresponding to the gas turbine engine for a period of time greater than a predetermined reversal time limit.

13. The method as recited in claim 12, wherein the steps of permitting the increase in engine power of the gas turbine engine when the at least one criterion is not met and the thrust reverser is deployed in the thrust reversal mode, denying the increase in engine power of the gas turbine engine when the at least one criterion is met, and reducing engine power of the gas turbine engine when the at least one criterion is met are repeated when an aircraft velocity associated with an aircraft having the gas turbine engine is negative.

14. The method as recited in claim 12, wherein a minimum duration between a current iteration of the step of permitting the increase in engine power of the gas turbine engine when the at least one criterion is not met and the thrust reverser is deployed in the thrust reversal mode and a prior iteration of the step of denying the increase in engine power of the gas turbine engine when the at least one criterion is met is greater than the predetermined reversal time limit.

15. The method as recited in claim 14, wherein the step of denying the increase in engine power of the gas turbine engine when the at least one predetermined criterion is met includes comparing the minimum duration to an elapsed time since the predetermined reversal time limit was met.

16. The method as recited in claim 12, wherein the at least one criterion includes throttle position associated with an engine throttle of the gas turbine engine and an elapsed idle time since a previous thrust reversal cycle corresponding to the thrust reverser.

17. The method as recited in claim 16, wherein the at least one criterion relates to expiration of the elapsed idle time.

18. The method as recited in claim 12, wherein the at least one criterion is not met when the engine power of the gas turbine engine is below a predefined steady-state engine reverse power threshold.

* * * * *